April 25, 1961 — F. C. BURRELL — 2,981,379
AUTOMATIC VEHICLE BRAKE ADJUSTER
Filed June 9, 1958 — 2 Sheets-Sheet 1

INVENTOR.
Frank C. Burrell
BY
His Attorney

April 25, 1961 F. C. BURRELL 2,981,379
AUTOMATIC VEHICLE BRAKE ADJUSTER
Filed June 9, 1958 2 Sheets-Sheet 2

Material In Link 25a Having High Coefficient Of Expansion Relative To Link 25

INVENTOR.
Frank C. Burrell
BY
D. C. Staley
His Attorney

United States Patent Office 2,981,379
Patented Apr. 25, 1961

2,981,379

AUTOMATIC VEHICLE BRAKE ADJUSTER

Frank C. Burrell, Orchard Lake, Mich., assignor to General Motors Corporation, Detroit, Mich., a corporation of Delaware Filed June 9, 1958, Ser. No. 740,893

5 Claims. (Cl. 188—79.5)

This invention relates to a vehicle brake and more particularly to an automatic adjuster for a vehicle brake.

In the conventional vehicle drum brake it is necessary from time to time to make adjustments to provide the proper clearance between the brake shoes and the brake drum. As a rule this has been provided for in the past by means of a manual adjustment.

If given proper attention, this may be a satisfactory method in providing the proper clearance between the drum and the shoes. A means which would provide automatic adjustment and eliminate the need for proper attention of brake adjustments would be an advantage.

It is an object of this invention to provide an automatic brake adjusting device for a vehicle drum brake which operates during the brake actuating cycle.

It is another object of this invention to provide an automatic vehicle brake adjusting device by means of an automatic spacer connected to the center portion of the brake shoe and an automatic spacer between two of the adjacent cooperative ends of the brake shoes.

It is a further object of this invention to provide automatic adjustor for brakes through a spring and ratchet type means which operates as the brake is operated and released.

The objects of this invention are accomplished by placing a spacing means connected to the central portion of each of the two brake shoes in a conventional vehicle drum brake. These two automatic spacing means are mounted by a support on the backing plate. A connecting link is placed between this support and the brake shoe web. A spring and lock washer are then placed on this connecting link.

A similarly operated strut is connected between two of the adjacent ends of the brake shoe. This strut comprises two links. Each link is connected to an opposite brake shoe webbing. The one link carries a spring and one or two washers. Due to the spring and the beveled shape end on the outer or sleeve link, the strut is automatically extended and locked as the brake operates.

The brake is operated by means of a hydraulic cylinder. As the two ends of these shoes are spread apart in the process of engaging the brake drum, the washer on the connecting link in the central portion of the brake shoe will slide longitudinally on the link. As this washer slides longitudinally on the link, the shoe is pivoting on the opposite end of the brake shoe or the point where the strut is connected to the adjacent ends of the shoe. As the brake is released, the adjacent ends of the brake shoe which were operated by the hydraulic cylinder are then contracted by means of return springs. As the brake shoes return to the rest position on the anchor pin, the shoe pivots about the central portion where the adjustable support is mounted. This provides for extension of the automatic adjusting strut member. The process here is similar to that of the adjustment in the central portion of the brake shoe. This process of automatic adjustment is provided only when excessive clearance is present between the brake shoes and the brake drum.

Further objects and advantages of the present invention will be apparent from the following description, reference being had to the accompanying drawings wherein a preferred embodiment of the present invention is clearly shown.

In the drawings—

Figure 1:
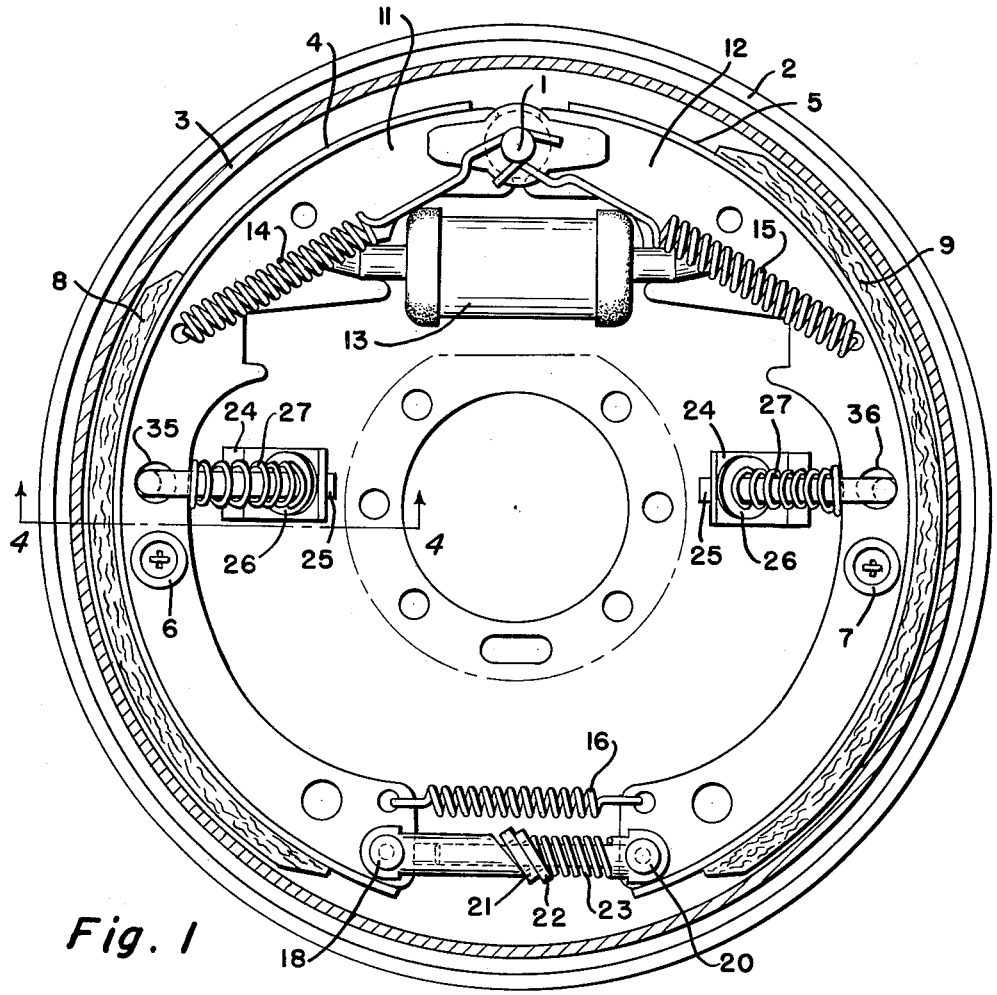
Fig. 1 is a side elevation view with the brake drum only shown in cross section.

Fig. 1 shows the general arrangement of the component parts of the vehicle drum brake and also includes the automatic adjusting means. An anchor pin 1 is mounted on the backing plate 2. The drum 3 is concentrically mounted in spaced relation to the backing plate 2. A primary shoe 4 and a secondary shoe 5 are operatively positioned within the brake drum 3. These two brake shoes are mounted on supporting pins 6 and 7. The brake shoes 4 and 5 also carry a friction material 8 and 9 respectively. Two of the brake shoe ends engage the anchor pin 1 when in the normal or resting position. These end portions which engage the pin 1 comprise the brake shoe webbing 11 and 12. A hydraulic cylinder 13 is used for actuating these two cooperative adjacent ends of the brake shoe webs 11 and 12. The brake shoes are returned to their normal position by two tension springs 14 and 15 which are connected to the brake shoe webbing 11 and 12 and pin 1 on their opposite ends.

Figure 2:
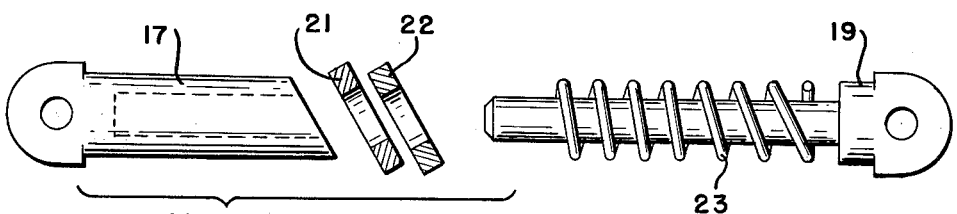
Fig. 2 is an exploded view showing the various component parts of the automatically adjusting strut.

The opposite two adjacent ends of the brake shoes are connected by means of a tension spring 16. A self-adjusting strut also connects two ends of the brake shoe webbing 11 and 12. This self-adjusting strut is shown in Fig. 2. The link connected to the primary shoe is shown at 17. Means are provided for a pin 18 which is inserted through the member 17 and the brake shoe web 11. This link 17 is provided with a hollow cylindrical opening to receive a member 19 which connects to the opposite cooperative adjacent brake shoe web 12. This member 19 is also connected to the brake shoe webbing by a pin 20. When the two links 17 and 19 are assembled, the cylindrical extending portion of member 19 is received within the hollow sleeve portion of member 17. Two washers 21 and 22 are also placed around the outer periphery of cylindrical extending portion of member 19 and abut against the end of member 17. These washers are held in constant contact against the end of member 17 by means of a compression spring 23, which also fits around the outer periphery of the cylindrical extending portion of member 19.

Figure 4:
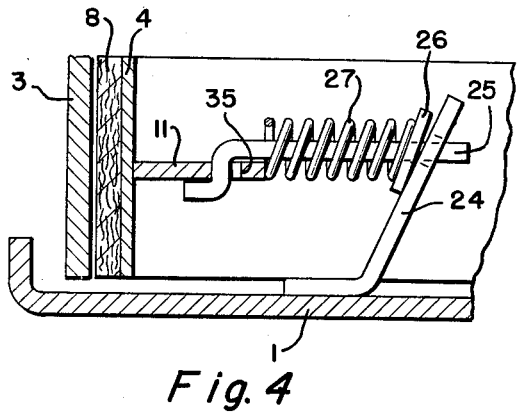
Fig. 4 is a cross-section view taken on line 4—4 of Fig. 1 which shows the self-adjusting means mounted on the backing member and connected to the central portion of the brake shoe web.
Figure 7:
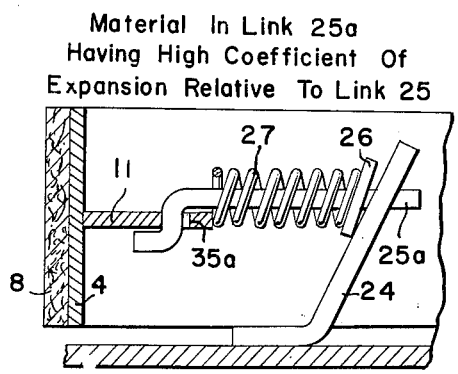
Fig. 7 is a view similar to Fig. 4 except a link having a high thermal expansion is used.

The self-adjusting means which is connected to the central portion of the webs 11 and 12 is shown in Fig. 4. A backing plate 1 is rigidly connected to a supporting bracket 24. A support bracket 24 extends inwardly from the backing plate and is provided with a hole for receiving a link member 25. This link member 25 extends radially outward to engage the brake shoe webbing 11. A washer 26 is placed about the outer periphery of link 25 adjacent to the supporting member 24. This washer is held in contact with the support member 24 by means of a spring 27. This spring is of the compression type and is disposed between washer 26 and shoe web 11. The shoe web 11 is connected to shoe 4 which, in turn, is connected to the friction material 8. The drum 3 is in spaced relation and mounted concentrically around the brake shoes 4. The support on the center portion of the secondary shoe is structurally the same as the support described above for the primary shoe.

Figure 3:
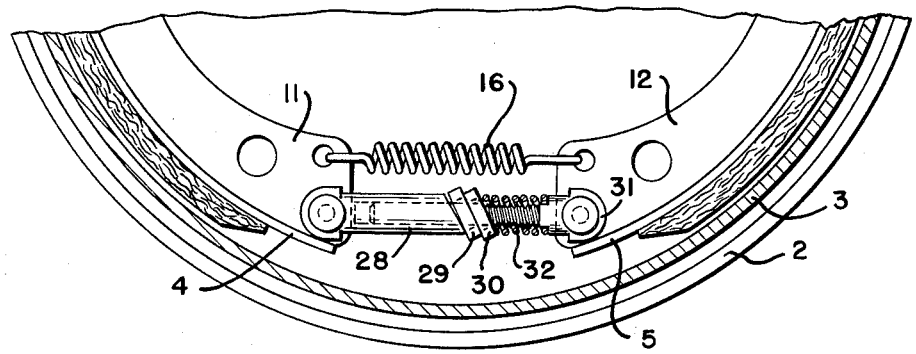
Fig. 3 is a portion of a side elevation view similar to Fig. 1 except that it shows a modified version of the self-adjusting strut. The internal member in this modification has a ratchet to provide more positive locking.
Figure 5:
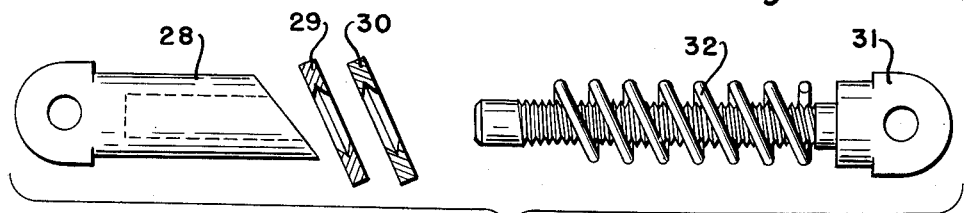
Fig. 5 is an exploded view of the self-adjusting strut which employs the ratchet type locking means.
Figure 6:
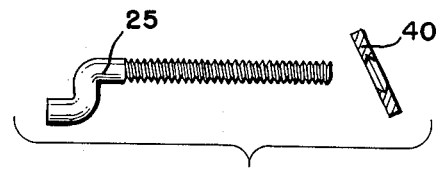
Fig. 6 is a modified view of link member 25 with a ratchet portion to engage washer 40.

Figs. 3 and 5 show a modified version of the ratchet type adjusting strut. The brake shoe webbing 11 and 12 are connected by means of spring 16 and the self-adjusting strut. The drum 3 and backing plate 2 and brake shoes 4 and 5 are all the same as illustrated in Fig. 1.

The self-adjusting strut is more clearly shown in Fig. 5. The link member 28 is similar to link 17 as previously described. The washers 29 and 30 have a V groove on the internal periphery of the washer. This edge is provided for a more positive lock on the threaded member 31. The threaded member 31 is of the same diameter as the previously described link 19, but it is provided with a threaded structure to engage the V groove of washers 29 and 30. This threaded portion on member 31 need not be threaded, but would be equally satisfactory if there were annular grooves perpendicular to the axis of the cylindrical portion. The link member 31, when assembled with the sleeve member 28, fits into the cylindrical opening of the sleeve member 28. The washer and spring also fit about the outer periphery of the threaded portion of link member 31. The washers 29 and 30 are under constant compression from the spring member 32 to provide the constant seating or engagement with the threaded portion. In operation, the device functions in the following manner: As the wheel cylinder 13 is actuated, the brake shoes 4 and 5 are moved outwardly until the frictional material 8 and 9 engages the drum 3. Both shoes pivot about a point on the opposite end of the brake shoe webbing where the shoe contacts the strut. The primary shoe 4 pivots about pin 18, and the secondary shoe 5 pivots about the pin 20. As the shoe moves outwardly, any clearance which may be present in the hole 35 of web 11 in which the link member 25 is inserted will then be "taken up." The spring 27 is under constant compression and forces against the webbing 11 and also the washer 26. If there was originally any excess clearance between the friction material 8 and the brake drum 3, the washer 26 will tend to align itself in a direction perpendicular to that of the axis of spring 27 and the center line of the elongated portion of link 25. As the friction material 8 engages the drum 3, a clearance would be present between the washer 26 and the support member 24. The washer 26 would automatically, through spring pressure from spring 27, be moved longitudinally along the member 25 and radially inward in relation to the brake structure. The movement of washer 26 would be obstructed by means of support 24 when the excess clearance is eliminated. The same situation is true of the secondary shoe and the operation is identical to that of the self-adjusting support member of the primary shoe.

As the brakes are released, the hydraulic wheel cylinder 13 will then contract. The tension springs or return springs 14 and 15 which are connected to the anchor pin 1 and also the shoe webbing 11 and 12 will return the brake shoes to their normal position. The brake shoes in their normal position will have the cooperative adjacent portions of the brake shoe webbings 11 and 12 engaging a portion of the anchor pin 1. During the process of the brake shoes returning to their normal position, the shoes will pivot about pins 18 and 20 until clearance in holes 35 and 36 is taken up. If the brake shoes are not in the rest position on anchor pin 1 at this point, it would be due to center support adjustment in the application of brakes. Then any further contraction of the shoes would change the pivot point of the shoe to the center point or holes 35 and 36. The pivoting action about this supporting means will expand the cooperative adjacent ends of the brake shoe webbing which are connected by the self-adjusting strut. This strut comprises the two members 28 and 31 and the spring member 32 with the washers 29 and 30. As the link member 31 moves outwardly from cooperating sleeve portion 28 of the adjusting strut, the washers 29 and 30 tend to align themselves in a more perpendicular position in relation to the axis of the cylindrical extending portion of link member 31. As the washers 29 and 30 align themselves in this position, they will be moved to an extended position on the link member 31 if there is any clearance between the washers and the adjoining portion of link member 28. The washers 29 and 30 being automatically shifted to a new position by the force of spring 32. In this manner the self-adjusting strut is extended and the brakes are automatically adjusted. The above-described operation will not be made on every brake actuation and release, but only at such time as when excessive clearance is present between the brake drums and the brake shoes. An added feature in this invention is also provided for clearance in the hole of the brake shoe webbing 11 which connects the link member 25. The clearance of this hole in relation to the link member 25 is provided to avoid excessive adjustment when the brakes are heated. An additional feature may also be incorporated providing a link member 25a which has a rapid rate of expansion or a coefficient of thermal expansion to avoid overadjustment instead of link 25.

While the embodiment of the present invention as herein disclosed constitutes a preferred form, it is to be understood that other forms might be adopted.

What is claimed is as follows:

1. A brake adjusting means for use with a vehicle drum brake comprising in combination, a backing plate, an anchor pin connected to said backing plate, a brake drum mounted adjacent said backing plate and concentric therewith, brake shoes for frictionally engaging said brake drum, said brake shoes having cooperatively adjacent ends, two of said cooperatively adjacent ends expanded by means of a hydraulic cylinder, return springs for contracting said adjacent ends and returning said adjacent ends to a rest position on said anchor pin, the brake adjusting means comprising a self-adjusting spacing means connected to the central portion of each of said brake shoes including a bracket adapted for mounting on said backing plate, a link member extending through a perforation on said bracket, an oversized opening in the webbing of said brake shoe for reception of said link, an offset portion connected to the main portion of said link extending through said opening with an end portion extending beyond said opening, a spring and locking member carried on said link to lock said link in an extended position, a self-adjusting strut member connecting two of the opposite adjacent cooperative ends of said brake shoes comprising, a sleeve member connected to one of the opposite ends of said brake shoes, a rod member connected to the other opposite end of said brake shoe to be received within said sleeve member, a spring and lock member carried on said rod member to provide automatic locking of said rod and sleeve member in an extended position, said adjustable spacing member and said self-adjusting strut member thereby providing brake adjustment when excessive clearance is present between said brake shoes and said drum.

2. A brake adjusting means for use with a vehicle drum brake comprising in combination, a backing plate, an anchor pin connected to said backing plate, a brake drum mounted adjacent to and concentric with said backing plate, brake shoes for engaging said brake drum and having cooperative adjacent ends, a hydraulic cylinder for expanding said brake shoes to contact said drum, return springs to contract said brake shoes from said brake drum, supporting means for said brake shoes, the brake adjusting means including a self-adjusting spacing means connected to the central portion of each of said brake shoes comprising an L-shaped bracket adapted for mounting on said backing plate, a link having parallel ends with a transverse intermediate portion connecting said ends for extending through an oversized hole in said brake shoe, a ratchet means on an elongated portion of said link extending through an opening in said bracket, a spring and washer carried on said elongated portion of said link, said spring and washer to provide automatic locking means, a self-adjusting strut means connecting the opposite two adjacent cooperative ends of said brake shoes, a member having a sleeve portion on the end extending from said brake shoe, a link member having a rod-like portion extending from said opposite end of said brake shoe, said rod-like portion forming ratchet means on its outer periphery, a spring and washers carried on said ratchet portion of said connecting link, said rod-like portion to be received within the sleeve portion of the opposite connecting member, said adjusting means and said self-adjusting spacing strut means for providing automatic adjustment of said brake means when said vehicle brake is operated.

3. A brake adjusting means for use with a vehicle drum brake comprised in combination, a backing plate, an anchor pin connected to said backing plate, a brake drum mounted adjacent to said backing plate and concentric therewith, brake shoes for engaging said brake drum, said brake shoes having cooperatively adjacent ends, two of said cooperatively adjacent ends expanded by means of a hydraulic cylinder, returned springs for contracting said adjacent brake shoe ends and returning said adjacent ends to rest position on said anchor pin, the brake adjusting means comprising a self-adjusting spacing means connected to the central portion of said brake shoes including an L-shaped bracket adapted for mounting on said backing plate, a link member of material having a high coefficient of heat expansion having a main body extending through a perforation in said bracket, a spring and locking member carried on the main body of said link to lock said link in an extended position, said link member having parallel ends connected by transverse intermediate portion, a self-adjusting member connecting two of the opposite adjacent cooperative ends of said brake shoes comprising a sleeve member connected to one of the opposite ends of said brake shoes, a rod member connected to the other opposite end of said brake shoe to be received within said sleeve member, a spring and lock member carried on said rod member to provide automatic locking of said rod and sleeve member in an extended position, said self-adjusting spacing means and said self-adjusting strut member thereby providing brake adjustment when excessive clearance is present between said brake shoes and said brake drum.

4. A brake adjusting means for use with a vehicle drum brake comprising in combination, a backing plate, a drum mounted concentric with and adjacent to said backing plate, two brake shoes mounted adjacent to said backing plate for engagement with said drum, the brake adjusting means including a spacing means for each of said shoes comprising, a bracket adapted for mounting on said backing plate, a link member having an alternately extending portion for engaging said brake shoe, an oversized hole in the webbing of said brake shoe for reception of said link, said link member loosely connected to said webbing of said brake shoe with a second portion of said link extending through a perforation in said bracket, said link having a serrated intermediate portion, a spring and a washer having a mating portion for engaging the serrated portion on said link to lock said spacing means in an elongated position, a self-adjusting strut means connecting two adjacent cooperative ends of said brake shoes and including a sleeve member connected to the first of said shoes, a rod member having a rod like portion with a serrated intermediate section, said rod member connected to the second of said brake shoes having the rod portion extending into the sleeve member, said rod portion receiving a spring and washer means, said washer means having a mating portion for engaging a serrated portion formed on the outer periphery of said rod like portion of said rod member, said self-adjusting spaced means and said self-adjusting strut means thereby providing means for adjusting a predetermined clearance between said brake shoes and said drum.

5. A brake adjusting means for use with a vehicle drum brake having brake shoes, a rotating brake drum mounted around said brake shoes, a backing plate mounted adjacent to and concentric with said brake drum, the brake adjusting means including a spacing means for each of said brake shoes comprising a bracket member adapted for mounting on said backing plate, a link member having longitudinal extending end portions connected by a transverse portion, an oversized hole in the webbing of said brake shoe for reception of said link member, said transverse portion of said link member engaging said brake shoe with an end portion extending through a perforation in said bracket, said link member being constructed of a material having a high coefficient of thermal expansion, said link member having a serrated intermediate portion for reception of a spring and a washer, said washer having a mating portion for engaging said serrated portion on said link member, a self-adjusting strut means connecting two cooperative adjacent ends of said brake shoes, said self-adjusting strut means including a sleeve member connected to one end of the first of said brake shoes, a rod member connected to the end of the second of said cooperative adjacent ends of said brake shoes and having a rod like portion extending into the sleeve member, said rod like portion having a serrated intermediate portion about its outer pheriphery, said intermediate portion for reception of a spring and a washer having a mating portion for engaging said serrated portion of said rod member, said adjusting spacing means of said self-adjusting strut means thereby providing an automatic adjustment for maintaining a predetermined clearance between said brake shoes and said brake drum.

References Cited in the file of this patent

UNITED STATES PATENTS

| | | |
|---|---|---|
| 2,168,646 | Goepfrich | Aug. 8, 1939 |
| 2,222,858 | Ryan | Nov. 26, 1940 |
| 2,244,084 | Saenger | June 3, 1941 |
| 2,291,662 | Thibeault | Aug. 4, 1952 |
| 2,293,836 | Lane | Aug. 25, 1952 |
| 2,327,819 | Robeson | Aug. 24, 1943 |
| 2,670,058 | Landrum | Feb. 23, 1954 |

FOREIGN PATENTS

| | | |
|---|---|---|
| 1,153,135 | France | Sept. 23, 1957 |